US012556935B2

(12) United States Patent
Yao et al.

(10) Patent No.: US 12,556,935 B2
(45) Date of Patent: Feb. 17, 2026

(54) METHOD AND SYSTEM FOR ACTIVATING BEAM STATE IN MAC CE

(71) Applicant: ZTE CORPORATION, Guangdong (CN)

(72) Inventors: Ke Yao, Shenzhen (CN); Bo Gao, Shenzhen (CN); Shujuan Zhang, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 18/331,614

(22) Filed: Jun. 8, 2023

(65) Prior Publication Data

US 2023/0388816 A1 Nov. 30, 2023

Related U.S. Application Data

(63) Continuation of application No. PCT/CN2021/085337, filed on Apr. 2, 2021.

(51) Int. Cl.
*H04W 16/28* (2009.01)
*H04W 72/1263* (2023.01)
*H04W 72/232* (2023.01)

(52) U.S. Cl.
CPC ....... *H04W 16/28* (2013.01); *H04W 72/1263* (2013.01); *H04W 72/232* (2023.01)

(58) Field of Classification Search
CPC ............. H04W 16/28; H04W 72/1263; H04W 72/232; H04W 52/42; H04B 7/0695; H04L 5/0023; H04L 5/1469
See application file for complete search history.

(56) References Cited

U.S. PATENT DOCUMENTS

| | | | |
|---|---|---|---|
| 2021/0136741 A1* | 5/2021 | Onggosanusi | H04W 72/23 |
| 2023/0022602 A1* | 1/2023 | Zhu | H04L 5/0023 |
| 2023/0103557 A1 | 4/2023 | Li | |

FOREIGN PATENT DOCUMENTS

| | | | | |
|---|---|---|---|---|
| CN | 110535617 A | | 12/2019 | |
| CN | 111357239 A | * | 6/2020 | H04W 72/23 |

(Continued)

OTHER PUBLICATIONS

Mediatek, Enhancement on Multi-Beam operation, R1-2100588, published Feb. 5, 2021 (See IDS filed, Aug. 1, 2024). (Year: 2021).*

(Continued)

*Primary Examiner* — Charles C Jiang
(74) *Attorney, Agent, or Firm* — Foley & Lardner LLP

(57) ABSTRACT

Example implementations include a wireless communication method of receiving, by a wireless communication device from a network, beam state activation information, the beam state activation information corresponding to a mode, and communicating, by the wireless communication with the network, a target signal according to at least one of the beam state activation information or the mode, wherein the target signal comprises at least one of downlink target signal or uplink target signal. Example implementations also include a wireless communication method of sending, by a network to a wireless communication device, a beam state activation information, the beam state activation information corresponding to a mode, and communicating, by the network with the wireless communication device, a target signal according to at least one of the beam state activation information or the mode, wherein the target signal comprises at least one of downlink target signal or uplink target signal.

12 Claims, 10 Drawing Sheets

(56) References Cited

FOREIGN PATENT DOCUMENTS

| CN | 114424651 A | * | 4/2022 | ............ H04W 72/04 |
|---|---|---|---|---|
| WO | WO-2018/171759 A1 | | 9/2018 | |

OTHER PUBLICATIONS

Apple Inc., "On Beam Management Enhancement", 3GPP TSG-RAN WG1 Meeting #103-e, R1-2101350, Feb. 5, 2021, e-Meeting (19 pages).

Catt, "Enhancements on multi-beam operation", 3GPP TSG RAN WG1 #104-e, R1-2100343, Feb. 5, 2021, e-Meeting (17 pages).

Ericsson, "Enhancements on Multi-beam Operation", 3GPP TSG-RAN WG1 Meeting #104-e Tdoc, R1-2101313, Feb. 5, 2021, Online (22 pages).

Moderator (Samsung), "Moderator summary for multi-beam enhancement", 3GPP TSG RAN WG1 #104-e, R1-2101185, Feb. 5, 2021, e-Meeting (37 pages).

Moderator (Samsung), "Moderator summary#2 for multi-beam enhancement: Round 1", 3GPP TSG RAN WG1 #104-e, R1-2101856, Feb. 5, 2021, e-Meeting (30 pages).

Xiaomi, "Enhancements on multi-beam operation", 3GPP TSG RAN WG1 #104-e, R1-2101092, Feb. 5, 2021, e-Meeting (10 pages).

International Search Report and Written Opinion for PCT Appl. No. PCT/CN2021/085337, mailed Dec. 31, 2021 (8 pages).

OPPO, "Enhancements on Multi-Beam Operation," 3GPP TSG RAN WG1 #104-e, R1-2100118, e-Meeting, Feb. 5, 2021 (25 pages).

Examination Report No. 1 for AU Appl. No. 2021437242, dated Feb. 21, 2024 (3 pages).

Extended European Search Report for EP Appl. No. 21934087.4, dated Jul. 2, 2024 (8 pages).

Mediatek Inc., "Enhancement on multi-beam operation", 3GPP TSG RAN WG1 #104-e, R1-2100588, Feb. 5, 2021, e-Meeting (27 pages).

* cited by examiner

| | 7 | 6 | 5 | 4 | 3 | 2 | 1 | 0 | 302 |
|---|---|---|---|---|---|---|---|---|---|
| 310 | | Serving Cell ID | | | | | BWP ID | | |
| C0 | TCI state 0_1 | | | | | | | | |
| R | TCI state 0_2 | | | | | | | | |
| ⋮ | | | | | | | | | |
| CN | TCI state N_1 | | | | | | | | |
| R | TCI state N_2 | | | | | | | | |

| | 7 | 6 | 5 | 4 | 3 | 2 | 1 | 0 | 402 |
|---|---|---|---|---|---|---|---|---|---|
| 410 | Num2: DL Mode | | | | Num1: Unified DL+UL | | | | |
| R1 | | Serving Cell ID | | | | | BWP ID | | |
| C0 | TCI state 0_1 | | | | | | | | |
| R | TCI state 0_2 | | | | | | | | |
| ⋮ | | | | | | | | | |
| CN | TCI state N_1 | | | | | | | | |
| R | TCI state N_2 | | | | | | | | |

| 7 | 6 | 5 | 4 | 3 | 2 | 1 | 0 | 602 |
|---|---|---|---|---|---|---|---|---|
| R1 | \multicolumn{5}{c}{Serving Cell ID} | | BWP ID | | |

| | | | | | | | | |
|---|---|---|---|---|---|---|---|---|
| R1 | Serving Cell ID | | | | | BWP ID | | |
| PL-RS List Starting Info. | | | Num_PLRS | | 610 | f2 | f1 | |
| C0 | TCI state 0_1 | | | | | | | |
| R | TCI state 0_2 | | | | | | | |
| CN | TCI state N_1 | | | | | | | |
| R | TCI state N_2 | | | | | | | |
| Bitmap-like Indication for Each TCI State Above | | | | | | | | |
| PL-RS List, Including at most P, e.g. 4 PL-RSs | | | | | | | | |

```
┌─────────────────────────────────────────────────────────────┐
│  Receive Beam State Activation Information          710     │
│  Corresponding to a Mode                                    │
│  ┌───────────────────────────────────────────────────────┐  │
│  │ Mode is a downlink mode, a uplink mode, a unified     │  │
│  │ downlink and uplink mode, a joint downlink and uplink │  │
│  │ mode, a joint frequency domain mode,                  │  │
│  │ or a non-specific mode                          712   │  │
│  └───────────────────────────────────────────────────────┘  │
│  ┌───────────────────────────────────────────────────────┐  │
│  │ Beam State Activation Information Includes            │  │
│  │ Group(s) of Beam States                               │  │
│  │                                                 714   │  │
│  └───────────────────────────────────────────────────────┘  │
└─────────────────────────────────────────────────────────────┘
```

Receive Beam State Activation Information Corresponding to a Mode — 710

Mode is a downlink mode, a uplink mode, a unified downlink and uplink mode, a joint downlink and uplink mode, a joint frequency domain mode, or a non-specific mode — 712

Beam State Activation Information Includes Group(s) of Beam States — 714

Determine Mode of a Beam State According to Downlink Control Information (DCI) — 720

Beam State(s) Used for Downlink Target Signal — 722

Beam State(s) Used for Uplink Target Signal — 724

Determine Mode to be Non-Specific Mode in Response to Determining that DCI Without Downlink Scheduling Information or Uplink Grant Information is Supported by Wireless Communication Device — 730

Determine Mode to be Non-Specific Mode in Response to Determining that DCI Without Downlink Scheduling Information or Uplink Grant Information is Configured by Network — 740

METHOD AND SYSTEM FOR ACTIVATING BEAM STATE IN MAC CE

CROSS-REFERENCE TO RELATED APPLICATION

This application claims the benefit of priority under 35 U.S.C. § 120 as a continuation of PCT Patent Application No. PCT/CN2021/085337, filed on Apr. 2, 2021, the disclosure of which is incorporated herein by reference in its entirety.

TECHNICAL FIELD

The present implementations relate generally to wireless communications, and more particularly to activating beam state in MAC CE.

BACKGROUND

Wireless signals in high frequency bands decay quickly, and coverage of the wireless signals becomes small. Thus, a flexible beam update mechanism is desired.

SUMMARY

With a unified TCI (transmission configuration indicator) architecture, TCI state can be applied to uplink and downlink, data and control channels (transmissions/receptions). For example, the beam state (also referred as TCI state, common TCI state, or common beam state) indicated by a DCI may be applied to at least one of multiple channels (i.e., target transmission, target signal), such as PDSCH, PDCCH, PUCCH, PUSCH, SRS or CSI-RS etc.

Example implementations include a wireless communication method of receiving, by a wireless communication device from a network, beam state activation information, the beam state activation information corresponding to a mode; communicating, by the wireless communication device with the network, a target signal according to at least one of the beam state activation information or the mode, wherein the target signal comprises at least one of downlink target signal or uplink target signal. Downlink target signal may comprise at least one of PDSCH, PDCCH, or CSI-RS. uplink target signal may comprise at least one of PUCCH, PUSCH, or SRS.

Example implementations also include a method where the mode comprises at least one of a downlink mode, a uplink mode, a unified downlink and uplink mode, a joint downlink and uplink mode, a joint frequency domain mode, or a non-specific mode.

Example implementations also include a method where the beam state activation information comprises one or more beam states, each of the one or more beam states corresponds to the mode, or the beam state activation information comprises one or more groups of beam states, each of the one or more groups of the beam states corresponds to the mode.

Example implementations also include a method where a beam state of the one or more beam states corresponding to the downlink mode, or a beam state of the one or more groups of beam states corresponding to the downlink mode is used for the downlink target signal.

Example implementations also include a method where a beam state of the one or more beam states corresponding to the uplink mode, or a beam state of the one or more groups of beam states corresponding to the uplink mode is used for the uplink target signal.

Example implementations also include a method where a beam state of the one or more beam states corresponding to the unified downlink and uplink mode, or a beam state of the one or more groups of beam states corresponding to the unified downlink and uplink mode is used for both the downlink target signal and the uplink target signal.

Example implementations also include a method where among beam states of the one or more beam states corresponding to the joint downlink and uplink mode, or beam states of the one or more groups of beam states corresponding to the joint downlink and uplink mode, at least one beam state is used for the downlink target signal and at least one other beam state is used for the uplink target signal.

Example implementations also include a method where the first half of the beam states in a group of activated beam state corresponding to the joint downlink and uplink mode are used for the downlink target signal, and the other half of the beam state are used for the uplink target signal, or the first half of the beam states in a group of activated beam state corresponding to the joint downlink and uplink mode are used for the uplink target signal, and the other half of the beam state are used for the downlink target signal.

Example implementations also include a method where each beam state in a group of activated beam state corresponding to the joint frequency domain mode are used for the target signal of a corresponding frequency domain unit in a group of frequency domain units.

Example implementations also include a method where the frequency domain unit comprises at least one of frequency band, Component Carrier (CC), serving cell, Bandwidth Part (BWP).

Example implementations also include a method where a beam state of the one or more beam states corresponding to the non-specific mode, or a beam state of the one or more groups of beam states corresponding to the non-specific mode is used for one of the downlink target signal or the uplink target signal, or for both the downlink target signal and the uplink target signal.

Example implementations also include a method of determining, by the wireless communication device from the network, the mode of an beam state according to a Downlink Control Information (DCI), and the beam state is indicated in the DCI.

Example implementations also include a method of determining, by the wireless communication device, the mode to be the non-specific mode in response to determining that a DCI without downlink scheduling information or uplink grant information is supported by the wireless communication device, or determining, by the wireless communication device, the mode to be the non-specific mode in response to determining that the DCI without the downlink scheduling information or the uplink grant information is configured by the network.

Example implementations also include a method of sending, by the wireless communication device to the network, information indicating that the wireless communication device supports one of a combination of the downlink mode and the uplink mode, a combination of the downlink mode, the uplink mode, and the unified downlink and uplink mode, the joint downlink and uplink mode, a combination of the joint downlink and uplink mode and the unified downlink and uplink mode, or the unified downlink and uplink mode.

Example implementations also include a method where a maximum number of beam states with downlink mode in one group of beam states is M1, a maximum number of beam states with uplink mode in one group of beam states is M2, a maximum number of beam states with downlink mode in the beam state activation information is M3, a maximum number of beam states with uplink mode in the beam state activation information is M4, each of one of M1, M2, M3, or M4 is an integer equal to or greater than 1.

Example implementations also include a method where a value of M1 is a predefined value or depends on a maximum number of beam states indicated in a DCI for the downlink target signal, a value of M2 is a predefined value or depends on a maximum number of beam states indicated in a DCI for a uplink target signal, or M3 or M4 is a predefined value or depends on at least one of capability of the wireless communication device or configuration by the network.

Example implementations also include a method where a number of activated beam states with the downlink mode comprises at least one of the number of beam states with the downlink mode, a number of beam states with the unified downlink and uplink mode, or a number of beam states with the joint downlink and uplink mode, or a number of beam states with of the uplink mode comprises at least one of a number of beam states with the uplink mode, the number of beam states with the unified downlink and uplink mode, or the number of beam states with joint downlink and uplink mode.

Example implementations also include a method where a number of beam states with downlink mode or uplink mode is a number of beam states with different beam state IDs with the downlink mode or the uplink mode respectively, or the number of beam states with the downlink mode or the uplink mode is a number of beam states with different values of a same type of Quasi Co-Location (QCL) parameter with mode of downlink or uplink respectively.

Example implementations also include a method of receiving, by the wireless communication device from the network, indication of at least one of a unified configuration or a separate configuration for the one or more groups of beam states, wherein one of the unified configuration is indicated, the mode is the unified downlink and uplink mode, the separate configuration is indicated, the mode is at least one of the downlink mode, the uplink mode, the joint downlink and uplink mode, or the non-specific mode, or both the unified configuration and the separate configuration are indicated, the mode is at least one of the downlink mode, the uplink mode, the unified downlink and uplink mode, the joint downlink and uplink mode, or the non-specific mode.

Example implementations also include a method of receiving, by the wireless communication device, a power control parameter information which indicates a power control parameter for the one or more beam states.

Example implementations also include a method where the power control parameter information comprises at least one power control parameter ID, each corresponding to one of the at least one beam state, the power control parameter information comprises at least one power control parameter ID, each corresponding to one of the at least one beam state which is indicated the related power control parameter is present, or the power control parameter information comprises at least one power control parameter ID which is an activated power control parameter set, and each one of the at least one beam state is indicated an index of the power control parameter ID in the activated power control parameter set.

Example implementations also include a method where the power control parameter information further comprises information used to determine a position of the at least one power control parameter ID in a medium Access Control (MAC) Control Element (CE). Example implementations also include a wireless communication method of sending, by a network to a wireless communication device, a beam state activation information, the beam state activation information corresponding to a mode, and communicating, by the network with the wireless communication device, a target signal according to at least one of the beam state activation information or the mode, wherein the target signal comprises at least one of downlink target signal or uplink target signal.

Example implementations also include a wireless communication apparatus with at least one processor and a memory, where the at least one processor is configured to read code from the memory and implement a method according to present implementations.

Example implementations also include a computer program product with a computer-readable program medium code stored thereupon, the code, when executed by at least one processor, causing the at least one processor to implement a method according to present implementations.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 3 illustrates a first example bit table, in accordance with present implementations.

FIG. 4 illustrates a second example bit table, in accordance with present implementations.

FIG. 6 illustrates a fourth example bit table, in accordance with present implementations.

FIG. 7 illustrates a first example method of activating beam state in MAC CE, in accordance with present implementations.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

New radio (NR) technology of fifth generation (5G) mobile communication systems can support high frequency bands. High frequency bands have abundant frequency domain resources, but wireless signals in high frequency bands can decay and coverage of the wireless signals becomes small. Thus, transmitting signals in a beam mode can concentrate energy in a relatively small spatial range and improve coverage of the wireless signals in the high frequency bands. In the beam scenario, as the time and position change, a beam pair between a base station and a user equipment (UE) may also change. In some implementations, a beam state includes at least one of: a quasi co-location (QCL) information, a transmission configuration indicator (TCI) state, spatial relation information, reference signal information, spatial filter information, or precoding information.

Figure 1A:
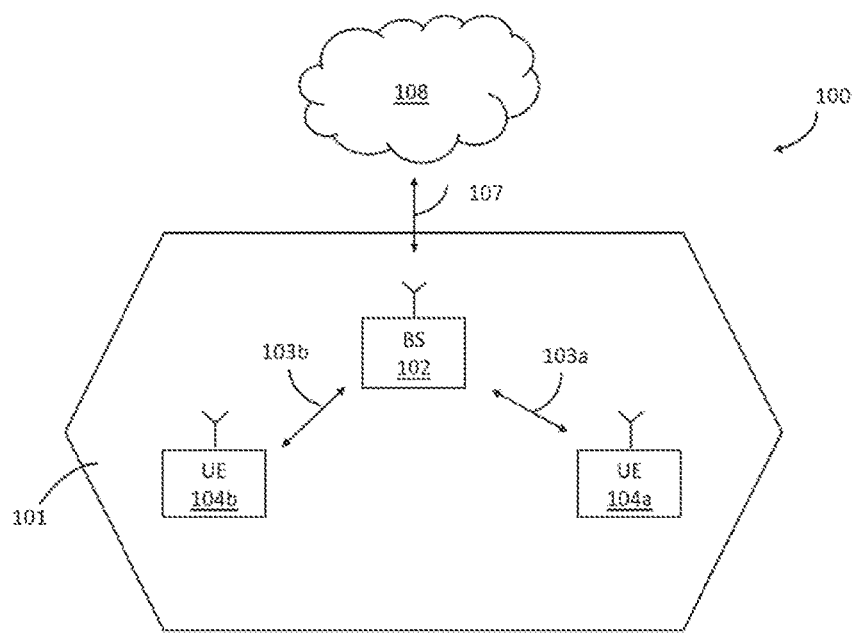
FIG. 1A is a diagram illustrating an example wireless communication network, according to various arrangements.

FIG. 1A shows an example wireless communication network 100. The wireless communication network 100 corresponds to a group communication within a cellular network. In the wireless communication network 100, a network side communication node or a base station (BS) can include one or more of a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As In FIG. 1A, a network side communication node is represented by a BS 102, and a terminal side communication node is represented by a UE 104*a* or 104*b*. In some arrangements, the BS 102 is sometimes referred to as a "wireless communication node," and the UE 104*a*/104*b* is sometimes referred to as a "wireless communication device."

As shown in FIG. 1A, the BS 102 can provide wireless communication services to the UEs 104*a* and 104*b* within a cell 101. The UE 104*a* can communicate with the BS 102 via a communication channel 103*a*. Similarly, the UE 104*b* can communicate with the BS 102 via a communication channel 103*b*. The communication channels (e.g., 103*a* and 103*b*) can be through interfaces such as but not limited to, an Uu interface which is also known as Universal Mobile Telecommunication System (UMTS) air interface. The BS 102 is connected to a Core Network (CN) 108 through an external interface 107, e.g., an Iu interface.

Figure 1B:
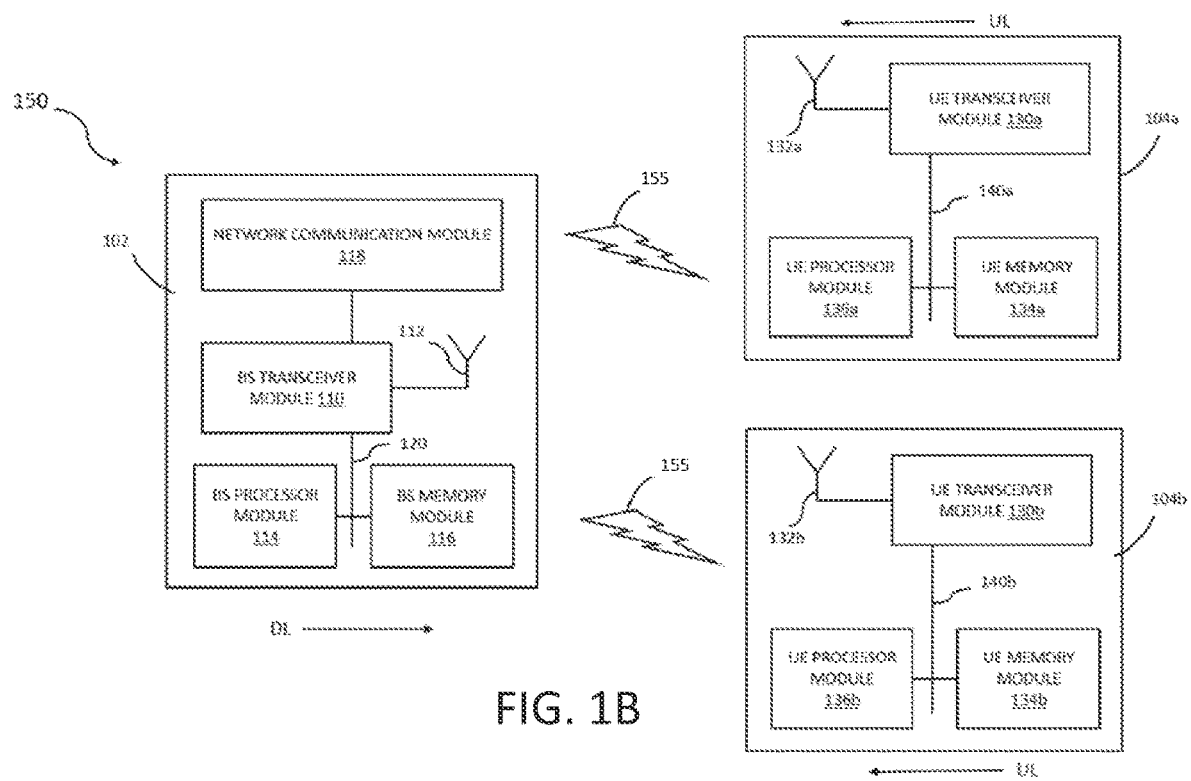
FIG. 1B is a diagram illustrating a block diagram of an example wireless communication system for transmitting and receiving downlink and uplink communication signals, according to various arrangements.

FIG. 1B illustrates a block diagram of an example wireless communication system 150 for transmitting and receiving downlink and uplink communication signals, in accordance with some arrangements of the present disclosure. Referring to FIGS. 1A and 1B, in the system 150, data symbols can be transmitted and received in a wireless communication environment such as the wireless communication network 100 of FIG. 1A.

The system 150 generally includes the BS 102 and UEs 104*a* and 104*b*. The BS 102 includes a BS transceiver module 110, a BS antenna 112, a BS memory module 116, a BS processor module 114, and a network communication module 118. The modules/components are coupled and interconnected with one another as needed via a data communication bus 120. The UE 104*a* includes a UE transceiver module 130*a*, a UE antenna 132*a*, a UE memory module 134*a*, and a UE processor module 136*a*. The modules/components are coupled and interconnected with one another as needed via a data communication bus 140*a*. Similarly, the UE 104*b* includes a UE transceiver module 130*b*, a UE antenna 132*b*, a UE memory module 134*b*, and a UE processor module 136*b*. The modules/components are coupled and interconnected with one another as needed via a data communication bus 140*b*. The BS 102 communicates with the UEs 104*a* and 104*b* via communication channels 155, which can be any wireless channel or other medium known in the art suitable for transmission of data as described herein.

The system 150 can further include any number of modules/elements other than the modules/elements shown in FIG. 1B. The various illustrative blocks, modules, elements, circuits, and processing logic described in connection with the arrangements disclosed herein can be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionalities. Whether such functionalities are implemented as hardware, firmware, or software depends upon the particular application and design constraints imposed on the overall system. Those familiar with the concepts described herein may implement such functionalities in a suitable manner for each particular application, but such implementation decisions should not be interpreted as limiting the scope of the present disclosure.

A wireless transmission from an antenna of each of the UEs 104*a* and 104*b* to an antenna of the BS 102 is known as an uplink transmission, and a wireless transmission from an antenna of the BS 102 to an antenna of each of the UEs 104*a* and 104*b* is known as a downlink transmission. In accordance with some arrangements, each of the UE transceiver modules 130*a* and 130*b* may be referred to herein as an uplink transceiver, or UE transceiver. The uplink transceiver can include a transmitter circuitry and receiver circuitry that are each coupled to the respective antenna 132*a* and 132b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter circuitry and receiver circuitry that are each coupled to the antenna 112. A downlink duplex switch may alternatively couple the downlink transmitter or receiver to the antenna 112 in time duplex fashion. The operations of the transceivers 110, 130a, and 130b are coordinated in time such that the uplink receiver is coupled to the antenna 132a and 132b for reception of transmissions over the wireless communication channels 155 at the same time that the downlink transmitter is coupled to the antenna 112. In some arrangements, the UEs 104a and 104b can use the UE transceivers 130a and 130b through the respective antennas 132a and 132b to communicate with the BS 102 via the wireless communication channels 155. The wireless communication channel 155 can be any wireless channel or other medium suitable for downlink (DL) and/or uplink (UL) transmission of data as described herein.

The UE transceiver 130a/130b and the BS transceiver 110 are configured to communicate via the wireless data communication channel 155, and cooperate with a suitably configured antenna arrangement that can support a particular wireless communication protocol and modulation scheme. In some arrangements, the UE transceiver 130a/130b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a/130b and the BS transceiver 110 may be configured to support alternate, or additional, wireless data communication protocols, including future standards or variations thereof.

The processor modules 136a and 136b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connection with the arrangements disclosed herein may be embodied directly in hardware, in firmware, in a software module executed by processor modules 114, 136a, and 136b, respectively, or in any practical combination thereof. The memory modules 116, 134a, 134b can be realized as RAM memory, flash memory, ROM memory, EPROM memory, EEPROM memory, registers, a hard disk, a removable disk, a CD-ROM, or another suitable form of storage medium. In this regard, the memory modules 116, 134a, and 134b may be coupled to the processor modules 114, 136a, and 136b, respectively, such that the processors modules 114, 136a, and 136b can read information from, and write information to, the memory modules 116, 134a, and 134b, respectively. The memory modules 116, 134a, and 134b may also be integrated into their respective processor modules 114, 136a, and 136b. In some arrangements, the memory modules 116, 134a, and 134b may each include a cache memory for storing temporary variables or other intermediate information during execution of instructions to be executed by processor modules 114, 136a, and 136b, respectively. Memory modules 116, 134a, and 134b may also each include non-volatile memory for storing instructions to be executed by the processor modules 114, 136a, and 136b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

The BS 102 can communicate with a plurality of UEs (including the UEs 104a and 104b) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scramble identifier (ID), and so on.

In some implementations of the wireless communication network 100 and the wireless communication system 150, for multicast of Radio Resource Control (RRC)-CONNECTED UEs, a common frequency resource for group-common PDCCH/PDSCH is confined within the frequency resource of a dedicated unicast Bandwidth Part (BWP) to support simultaneous reception of unicast and multicast in the same slot. Two options can be used for the common frequency resource for group-common PDCCH/PDSCH. In a first option, the common frequency resource is defined as an MBS-specific BWP, which is associated with the dedicated unicast BWP and using the same numerology (e.g., Subcarrier Spacing (SCS) and Cyclic Prefix (CP)). Accordingly, BWP switching is needed between the multicast reception in the MBS-specific BWP and unicast reception in its associated dedicated BWP.

In a second option, the common frequency resource is defined as an "MBS frequency region" with a number of contiguous PRBs, which is configured within the dedicated unicast BWP. The starting PRB and the length of PRBs of the MBS frequency region are indicated using a suitable mechanism. In the second option, a MBS BWP is used for MBS transmission, which is associated to unicast BWP. MBS BWP and unicast BWP can be used for the MBS PDSCH and unicast PDSCH transmission, which need simultaneous activation of two BWPs. The arrangements disclosed herein relate to managing the operations of two active BWPs.

As used herein, BWP refers to a portion of contiguous frequency resource in a cell. In other words, a BWP is a continuous range of frequencies that can be used for communications between a BS and UEs. Some transmission parameters and channel configurations are BWP-specific. Different UEs can have different BWP configurations. In one implementation, at most one of multiple configured BWPs can be activated due to lack of time, although at most four BWPs can be configured for a UE. In other words, for a UE, at most one active DL BWP and at most one active UL BWP at a given time can be activated for a given serving cell.

In some implementations, a UE receives signaling from gNB or a network, obtains a beam state information, determines mode of the beam state information, and determines transmit or receive parameter for a target signal, transmission, or reception, based on at least one of the beam state information or the mode of the beam state information. The target signal or transmission, reception comprises at least one of PDSCH, PDCCH, CSI-RS, PUSCH, PUCCH, or SRS.

Figure 2:
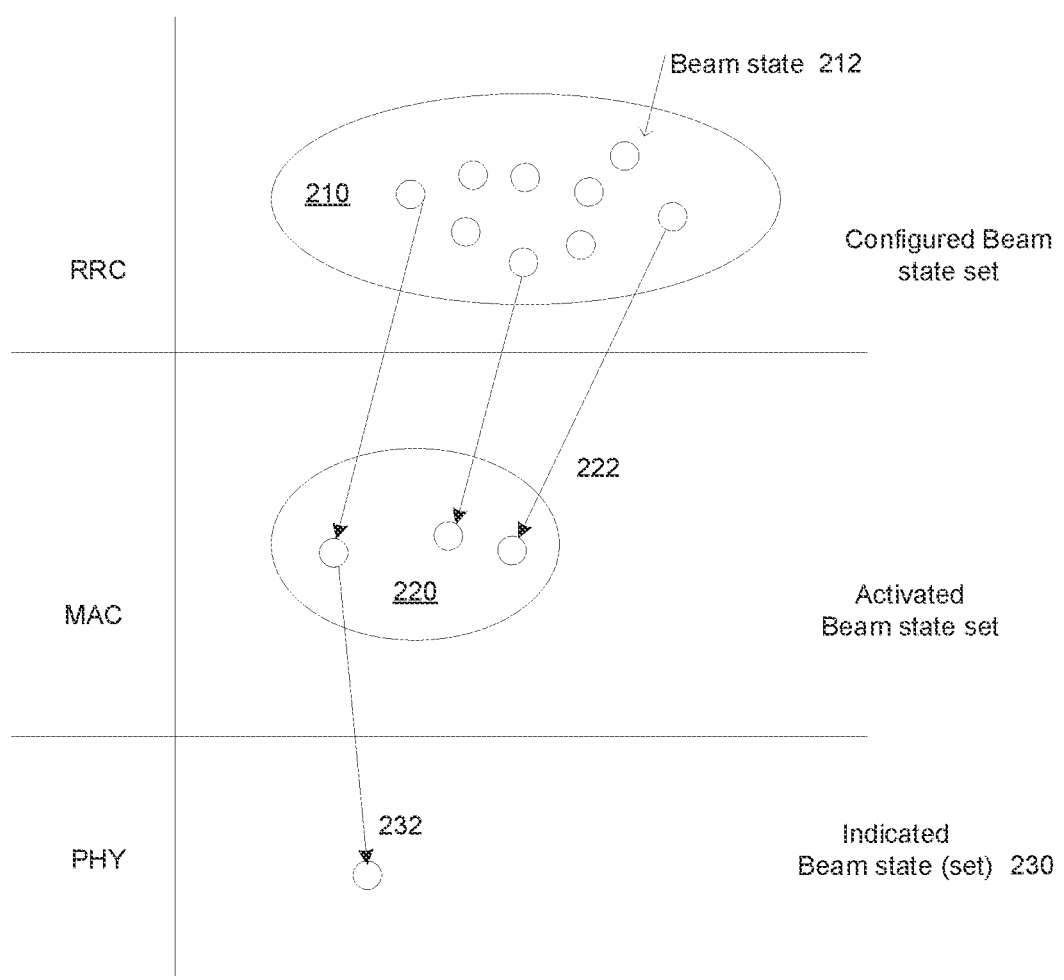
FIG. 2 illustrates an example framework of a system of activating beam state in MAC CE, in accordance with present implementations.

FIG. 2 illustrates an example framework of a system of activating beam state in MAC CE, in accordance with present implementations. As illustrated by way of example in FIG. 2, an example system 200 includes a configured beam state set 210 associated with one or more beam states 212, an activated beam state set 220 associated with one or more activated beam states 222, and an indicated beam state set 230 associated with one or more indicated beam states 232. It is to be understood that in FIG. 2, the indicated beam state set 230 is coterminous with a single example indicated beam state 232. It is to be further understood that the indicated beam state set 230 can be associated with more than one indicated beam state 232.

As one example, the at least one activated beam state can be determined according to the beam state activation information. The at least one activated beam state can include the beam state activation information, or refer to the activated beam state from the at least one group of activated beam states. As another example, a power control parameter information and the beam state activation information can be received by the wireless communication device in a same signaling, or in different signaling respectively. The signaling can be MAC CE. In some implementations, an indicated beam state can correspond to the one or more beam states.

In some implementations, a framework of a system obtains the beam state information according to at least one of a configured beam state set configured by a RRC signaling, an activated beam state set activated by a MAC CE, or an indicated beam state or indicated beam state set indicated by a DCI signaling.

Example mode of beam state when activated in MAC CE. In some implementations, each activated beam state may be associated with a mode of one of "DL", "UL", "DL and UL", or "non-specific." An activated Beam state set may comprise at least one beam state group. Each beam state group can correspond to a value of a codepoint of beam state indication field, e.g. Transmission configuration indication field in DCI. In some implementations, the maximum number of beam states with mode of DL in one group of activated beam state is M1. In some implementations, M1 is an integer equal to or greater than 1. The value of M1 can depend on the maximum number of beam state indicated in a DCI for a PDSCH. E.g. M1=1, 2, 4, or 8. As one example, when a beam state is indicated by a DCI, its mode is also indicated by the DCI. In some implementations, the beam state indicated by a DCI belongs to the set of the beam states activated by a MAC CE. It is to be understood that a DCI is not limited to a specific DCI. As one example, DCI can be DCI format 1_1 or DCI format 1_2. As one example, in the case that the DCI format 1_1 or 1_2 without downlink scheduling information or uplink grant information is applied, many bits in the DCI which are initially designed for the downlink scheduling information or uplink grant information can be used to indicate more information about beam state indication. With more beam state indication fields for downlink and uplink respectively, mode for the indicated beam state. Such information indicated in DCI can provide more flexibility than the scheme that the mode of beam state is determined when the beam state is activated in MAC CE.

In some implementations, the maximum number of beam states with mode of UL in one group of activated beam state is M2. In some implementations, M2 is an integer equal to or greater than 1. The value of M2 can depend on the maximum number of beam state indicated in a DCI for a PUSCH. E.g. M2=1, 2, 4, or 8.

In some implementations, the maximum number of beam states with mode of DL in a MAC CE is M3. In some implementations, M3 is an integer equal to or greater than 1. The value of M3 can be a predefined value or depend on UE capability and/or configuration by gNB. As one example, M3=1, 2, 4 or 8. M3 may be determined per BWP or per serving cell.

In some implementations, the maximum number of beam state with mode of UL in a MAC CE is M4. In some implementations, M4 is an integer equal to or greater than 1. The value of M4 can be a predefined value or depend on UE capability and/or configuration by gNB. E.g. M4=1, 2, 4 or 8. As one example, M4 may be determined per BWP or per serving cell.

As one example, a group of activated beam states can include 2 beam states, each corresponding to one corresponding serving cell in a group of serving cells which includes 2 serving cells. Here, the first beam state corresponds to the first serving cell in the group of serving cells, and the second beam state corresponds to the second serving cell in the group of serving cells.

In some implementations, the number of activated beam state with mode of DL includes the number of activated beam state with mode of "DL" and the number of activated beam state with mode of "DL and UL". The number of activated beam state with mode of UL can include the number of activated beam state with mode of "UL" and the number of activated beam state with mode of "DL and UL".

In some implementations, number of activated beam states with mode of DL or UL refers to the number of non repetitive beam states, or the number of different beam states. For example, two different beam states may refer to: the two beam states have different type D QCL parameters (a source/reference RS with qcl-Type set to 'typeD' for a beam state), or the two beam states have different other type of QCL parameters (a source/reference RS with qcl-Type set to 'typeA', 'typeB', or 'typeC' for a beam state), or the two beam states have different any type of QCL parameters. As one example, type can include Type D or the like.

In some implementations, each group of activated beam state corresponds to one of grouping mode of mode: "DL", "UL", "unified DL and UL", "joint DL and UL", or "non specific." First, the group of activated beam state corresponding to "DL" can include activated beam state(s) with mode of DL. Second, the group of activated beam state corresponding to "UL" can include activated beam state(s) with mode of UL. Third, the group of activated beam state corresponding to "unified DL and UL" can include activated beam state(s) with mode of both DL and UL. It is to be understood that that a grouping mode can corresponding to a mode as discussed herein. A mode of a beam state indicates the usage or usage mode of a beam state. A mode of a beam state group may refer to the usage, usage mode, or grouping mode of usage of a beam state group. "DL", "UL", "unified DL and UL", "joint DL and UL", or "non specific" corresponds to a downlink mode, a uplink mode, a unified downlink and uplink mode, a joint downlink and uplink mode, or a non-specific mode respectively.

Fourth, the group of activated beam state corresponding to "joint DL and UL" can include activated beam state(s), part of which can be associated with usage of DL and the other part of which can be associated with usage of UL. As one example, half of the activated beam state(s) in the group are with usage of DL, and the other half of the activated beam state(s) are with usage of UL. The order of DL and UL can be predefined, and can comprise one of DL first or UL first. For example, a group of beam state corresponding to "joint DL and UL" comprises TCI state #1 for DL, and TCI state #2 for UL. In MTRP and/or multi-panel scenario, a group of beam states corresponding to "joint DL and UL" can comprise TCI state #1 and #2 for DL, and TCI state #3 and #4 for UL.

Fifth, the group of activated beam states corresponding to "Non specific" can include activated beam state(s) with usage of non specific. Thus, in some implementations, the beam state is activated without related to any usage. The usage of the activated beam state can be determined by a DCI when it is indicated in the DCI. Further, a MAC CE can include at least one group of activated beam states with at least one of the above grouping mode of usage. Each group can be associated with one grouping mode of usage.

In some implementations, groups with the same grouping mode of usage are adjacent, and the order of groups with different grouping mode of usages are predefined. As one example, the order may be: "DL", "UL", "unified DL and UL", "joint DL and UL", or "non specific" once available. For one example, there are 4 groups with grouping mode of usage of "DL", and 4 groups with grouping mode of usage of "UL".

Furthermore, UE (user equipment) can be configured by gNB (or network), e.g. through RRC signaling, at least one of "unified" or "separate" for grouping mode of usage. When "unified" is configured/enabled, the grouping mode of usage of group(s) in MAC CE can be at least one of "unified DL and UL." When "separate" is configured/enabled, the grouping mode of usage of group(s) in MAC CE can be at least one of "DL", UL", "joint DL and UL", or "non specific." When "unified" and "separate" is configured/enabled, the grouping mode of usage of group(s) in MAC CE can be at least one of "DL", "UL", "unified DL and UL", "joint DL and UL", or "non-specific." "unified" or "separate" corresponds to a unified configuration or a separate configuration respectively.

A MAC CE can include a field to indicate the mode of the one or more beam states or the one or more groups of beam states in this MAC CE. If the field indicates one of the mode among a downlink mode, a uplink mode, a unified downlink and uplink mode, a joint downlink and uplink mode, a joint frequency domain mode, or a non-specific mode, the indicated mode can be applied for all beam states of the one or more beam states or the one or more groups of beam states in this MAC CE.

FIG. 3 illustrates a first example bit table, in accordance with present implementations. As illustrated by way of example in FIG. 3, an example bit table 300 includes bit positions 302 and mode field 310 indicating joint:R sep:UL/DL.

As shown by way of example in Table 1, a mode field occupies 1 bit. If the UE is configured to a unified configuration, this field is reserved. If the UE is configure to a separate configuration, the one bit is used to indicate the mode of a downlink mode, or a uplink mode.

In some implementations, TCI states 0_1, 0_2, . . . to N_2 are the one or more beam states indicated in or activated by the MAC CE. As one example, TCI state x_2 is present if the bit Cx (x=0, 1, N) is set to 1, otherwise no TCI state x_2 is present. One beam state group can include one or more beam states, where a beam state group can include only TCI state 0_1 if TCI state 0_2 is not present, or a beam state group can include TCI state 0_1 and 0_2 if TCI state 0_2 is present. As shown by way of example in FIG. 3, there are N beam state groups, or at most 2*N beam states.

In some implementations, a serving cell ID and BWP ID fields indicate the serving cell and BWP information of the TCI state indicated in this MAC CE. If the UE have more than 2 options for the mode, the mode field can occupy more than 1 bit. A MAC CE can activate beam state group(s) with more than one mode for the one or more beam states or one or more beam state groups in the corresponding MAC CE.

FIG. 4 illustrates a second example bit table, in accordance with present implementations. As illustrated by way of example in FIG. 4, an example bit table 400 includes bit positions 402 and a field indicating mTRP_DCI.

In some implementations, a MAC CE includes one or more fields to indicate the position of the beam state or beam state group with different modes for the beam states in this MAC CE. As shown by way of example in FIG. 4, the mode includes "unified DL and UL mode", "DL mode", and "UL mode" for the beam states present in this MAC CE. As one example, the order among them can be "unified DL and UL", "DL", and "UL". Thus, the number of beam states or beam state groups with "unified DL and UL" and the number of beam state group with "DL" can be indicated by, e.g., the Num1 field and the Num2 field. The number of beam state or beam state group with UL mode can be indicated in another field, such as Num3 or be determined by the residual part of the MAC CE whose length is indicated in the header of this MAC CE.

As one example, the mTRP_DCI field is used to indicate single-DCI scheme or multiple-DCI scheme for multiple TRP scenario. R1 field can indicate CORESET pool ID if multiple-DCI scheme is indicated. R1 field can be reserved if single-DCI scheme is indicated. If multiple-DCI scheme is indicated, C0, . . . , CN can be reserved, and there is no TCI state x_2, where x=0, 1, . . . , N.

In some implementations, the mTRP_DCI field is needed if a single-DCI scheme and multiple-DCI scheme are both configured for the UE. If only one of single-DCI scheme and multiple-DCI scheme is configured, mTRP_DCI field is not needed. Then, R1 field and C0, . . . , CN can be interpreted according to the configured single-DCI scheme or multiple-DCI scheme as above.

Example association between beam state with usage of UL and PL-RS. In some implementations, the beam state which can be applied to uplink transmission may be associated with power control parameters. The uplink transmission can include at least one of: PUCCH, PUSCH, SRS. The association between beam state and power control parameters can be configured by RRC signaling.

In some implementations, a power control parameter includes at least one of: open loop power control parameters, closed loop power control parameters, pathloss measurement parameters. In some implementations, an open loop power control parameter includes at least one of target receiving power, i.e. P0, factor of pathloss compensation, i.e. alpha; closed loop power control parameter comprises at least one of the number of closed loop power control (loop), or the index of closed loop power control (loop); pathloss measurement parameter comprises indication of RS for PL (pathloss) measurement, i.e. PL-RS. Among the power control parameters, PL-RS can be used for at least one of PUSCH, PUCCH, or SRS, the other power control parameters may be associated with each of uplink transmission.

In view of the following issues, the association between beam state and PL-RS can be set up or updated by MAC CE.

As one example, in view of a first issue, gNB configures by RRC signaling configured beam state set (or pool), and may configure the related power control parameters for the beam state which can be applied to UL. The number of beam state in configured beam state set, e.g. 128, 192, is usually larger than the number of beam state in activated beam state set by MAC CE, e.g. 8. the number of related PL-RS of the activated beam state set may be greater than 4, which is assumed to be the maximum number of PL-RS a UE can monitor for PL measurement. Then some beam state can be used to change its associated/related PL-RS, in order to fulfil the requirement of at most 4 PL-RS at a time.

As another example, in view of a second issue, PL-RS is a downlink RS. In the case of a beam state has a source RS which is a DL RS, since the same direction, DL for source RS/beam state and PL-RS, the relation between PL-RS and source RS/beam state may be reliable. In some implementations, a beam state is configured with a UL RS, i.e. SRS, as a source/reference RS. In this case, the directions of PL and beam state are different. The relation between beam state and PL-RS configured by RRC signaling can be inconsistent or unstable. When a UE rotates or moves, beam pair between the UE and a gNB is changing, which can require PL-RS to be updated by MAC CE which is more flexible.

In some implementations, an association between activated beam state and PL-RS can be set up or updated by MAC CE. In some implementations, a MAC CE includes at least one of PL-RS (list) and activated beam state (list). In some implementations, the activated beam state can be indicated by a beam state ID configured by RRC signaling, or by an index in one activated beam state set. The PL-RS can be indicated by a PL-RS ID configured by RRC signaling, e.g. an index of PL-RS in PL-RS pool configured for PUSCH, PUCCCH, SRS, or uplink, or by an index in one (activated) PL-RS set. In the case of one MAC CE including the activated beam state and PL-RS, the MAC CE can include at least one of: activated beam state, PL-RS, information for determining position of PL-RS in the MAC CE, information for determining the mapping between the activated beam state and the PL-RS.

Figure 5:
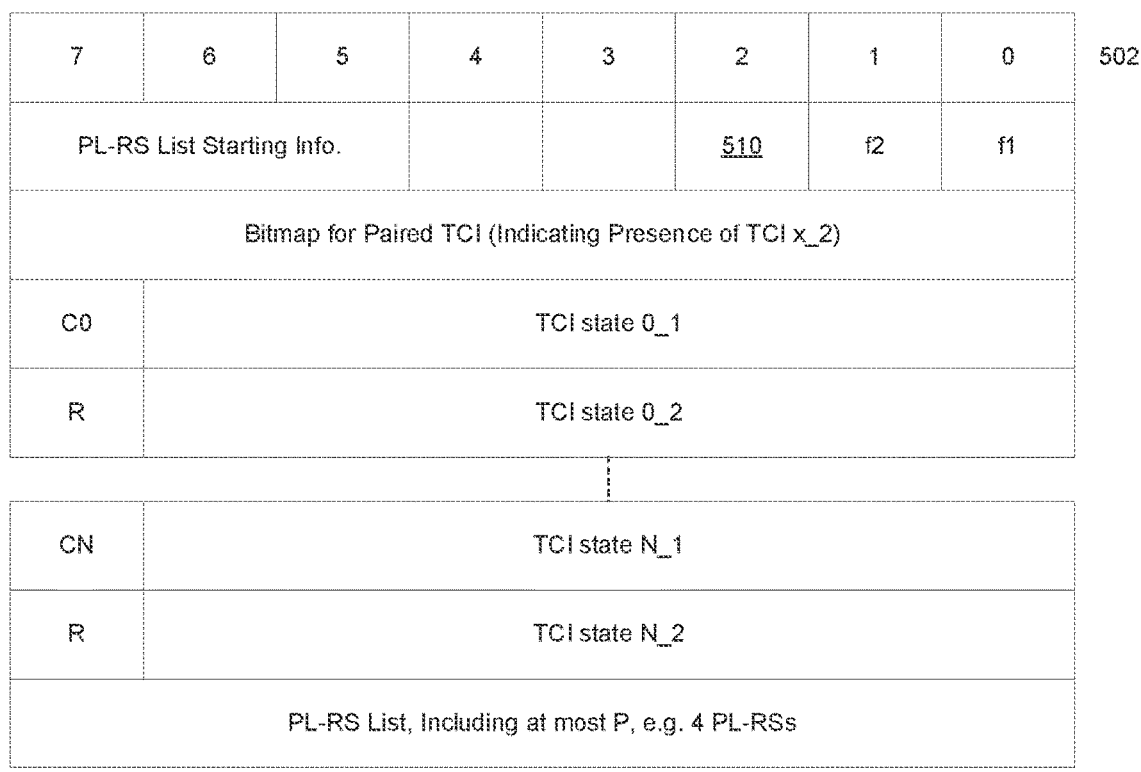
FIG. 5 illustrates a third example bit table, in accordance with present implementations.

FIG. 5 illustrates a third example bit table, in accordance with present implementations. As illustrated by way of example in FIG. 5, an example bit table 500 includes bit positions 502 and a field indicating mTRP_DCI.

In some implementations, the information for determining the mapping between the activated beam state and the PL-RS comprises whether the related PL-RS of an activated beam state is present, e.g. as shown in table 3, C x_½ is used to indicate the presence of corresponding PL-RS which is listed following up the TCI states. A bitmap for paired TCI can be used to indicate the presence of TCI x_2, each bit corresponding to a value of x. PL-RS list starting info is used to determine the position of PL-RS information in this MAC CE.

FIG. 6 illustrates a fourth example bit table, in accordance with present implementations. As illustrated by way of example in FIG. 6, an example bit table 600 includes bit positions 602 and a field 610 indicating mTRP_DCI.

In some implementations, the information for determining the mapping between the activated beam state and the PL-RS includes an Index within an activated PL-RS set or list. As shown by way of example in FIG. 6, at most P, e.g. p=4 PL-RSs are indicated as activated PL-RS set. A "bitmap"-like indication for each above TCI state" can include Q bits for each TCI state activated by this MAC CE. Q depends on the number of PL-RS in the activated PL-RS set. E.g. Q=2, if there are 4 PL-RS in the activated PL-RS set. If there are 8 TCI state activated by this MAC CE, the bitmap-like indication can include 8 2-bit PL-RS index, which is an index within the activated PL-RS set. PL-RS list starting info can be used to determine the position of PL-RS information in this MAC CE.

Example association between a power control parameter and SRI in MTRP scenario. In some implementations, a UE can be indicated by one or more SRS resources for a PUSCH transmission for determining transmit precoding information and power control parameters. In some implementations, the one or more SRS resources are associated with power control parameters of PUSCH. The association between SRS resource and power control parameters of PUSCH can be configured by RRC signaling, and can be updated by MAC CE. SRI (SRS resource indicator) can be used to indicate the one or more SRS resources for a PUSCH. In some implementations, SRI corresponds to the values of SRI field in DCI format which schedules or activates a PUSCH transmission. Thus, in some implementations, MAC CE can activate/update the relation/association between SRI and power control information for PUSCH.

In MTRP or other scenarios, when the number of SRS resource set with usage of codebook or non-codebook is larger than 1, a MAC CE which activates/updates the relation/association between SRI and power control information for PUSCH can include an SRS resource set indication, such as SRS resource set ID, or an index of SRS resource set with certain usage. For example, the certain usage can be "codebook", "non codebook", or "antenna switching".

In some implementations, where a UE is configured by RRC signaling 5 SRS resource sets, with identification of SRS resource set #1, SRS resource set #2, SRS resource set #3, SRS resource set #4, SRS resource set #5, among them, usage of SRS resource set #1 and SRS resource set #2 are the same which is "beam management", usage of SRS resource set #3 and SRS resource set #4 are the same which is "codebook", and the usage of SRS resource set #5 is "antenna switching". In this case, where the above certain usage is "codebook", an index of SRS resource set with certain usage can be 0 or 1 corresponds to SRS resource set #3 or SRS resource set #4 respectively.

FIG. 7 illustrates a first example method of activating beam state in MAC CE, in accordance with present implementations. In some implementations, at least one of the UE performs method 700 according to present implementations. In some implementations, the method 700 begins at 710.

At 710, the UE receives beam state activation information corresponding to a mode. In some implementations, 710 includes at least one of steps 712 and 714. At 712, the mode is a downlink mode, a uplink mode, a unified downlink and uplink mode, a joint downlink and uplink mode, a joint frequency domain mode, or a non-specific mode. At 714, the beam state activation information includes a group or groups of beam states. It is to be understood that beam state activation information can include beam states to be activated. It is to be further understood that beam state indicated or activated in the beam state activation information can correspond to an activated beam state. It is to be further understood that a "to be activated beam state in MAC CE" can correspond to one or more beam states. It is to be further understood that a beam state indicated by DCI can correspond to at least one beam state. The method 700 then continues to 720.

At 720, the UE determines a mode of a beam state according to downlink control information (DCI). In some implementations, 720 includes at least one of steps 722 and 724. At 722, the beam state or beam states are used at least for a downlink target signal. At 724, the beam state or beam states are used at least for an uplink target signal. The method 700 then continues to 730.

At 730, the UE determines a mode to be a non-specific mode in response to determining at a DCI without downlink scheduling information or uplink grant information is supported by a wireless communication device. The method 700 then continues to 740. At 740, the UE determines a mode to be a non-specific mode in response to determining that a DCI without downlink scheduling information or uplink grant information is configured by a network. The method 700 then continues to 802.

Figure 8:
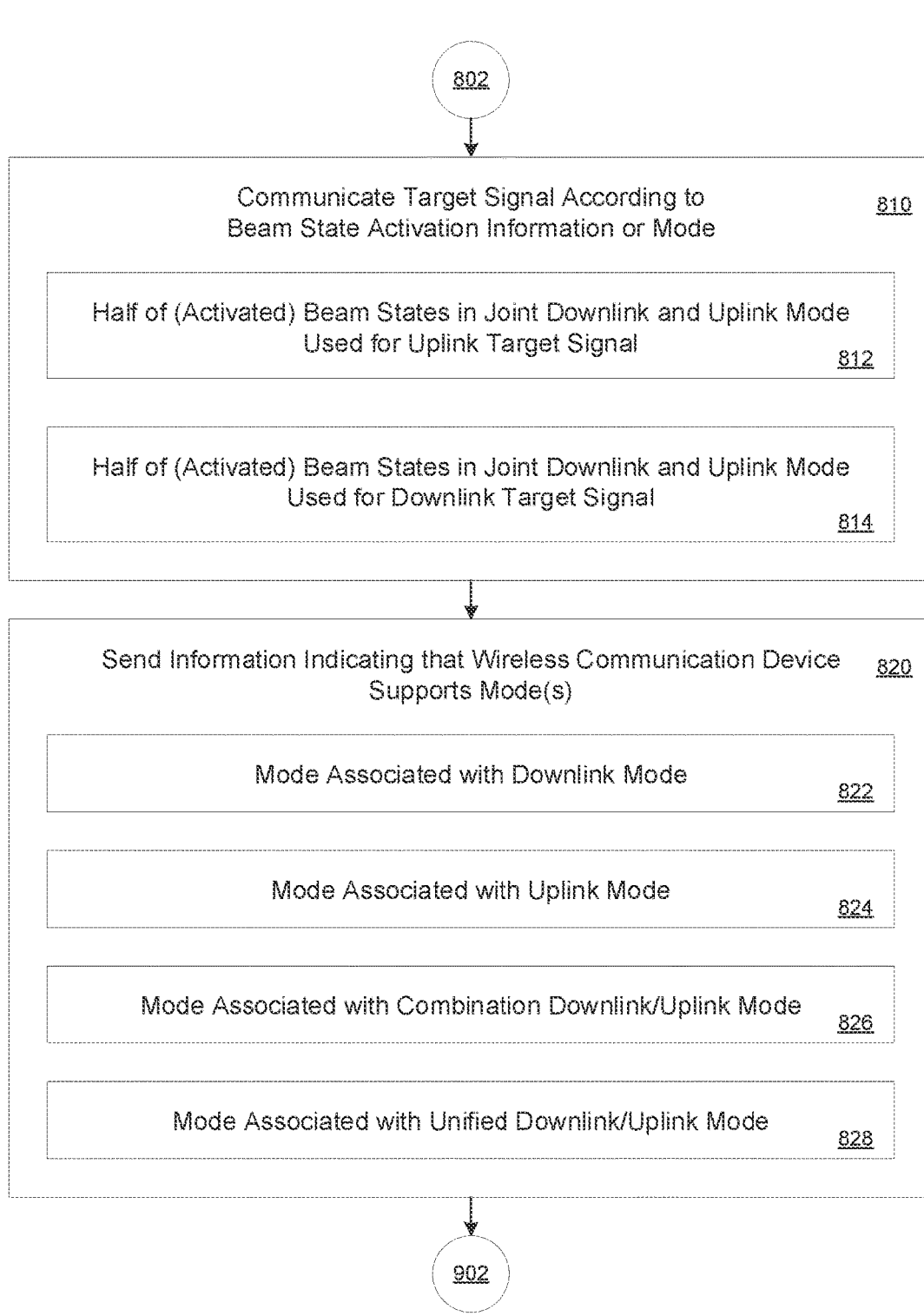
FIG. 8 illustrates a first example method of activating beam state in MAC CE further to the example method of FIG. 7.

FIG. 8 illustrates a first example method of activating beam state in MAC CE further to the example method of FIG. 7. In some implementations, at least one of the UE performs method 800 according to present implementations. In some implementations, the method 800 begins at 802. The method 800 then continues to 810.

At 810, the UE communicates a target signal according to beam state activation information or a mode. In some implementations, 810 includes at least one of steps 812 and 814. At 812, half of the beam states in a joint downlink and uplink mode are used for an uplink target signal. At 814, half of the beam states in a joint downlink and uplink mode are used for a downlink target signal. In some implementations, the beam states are or correspond to activated beam states. The method 800 then continues to 820.

At 820, the UE sends information indicating that the UE supports a particular mode or modes. In some implementations, 820 includes at least one of steps 822, 824, 826 and 828. At 822, the mode is associated with a downlink mode. At 824, the mode is associated with an uplink mode. At 826, the mode is associated with a combination downlink/uplink mode. At 828, the mode is associated with a unified downlink/uplink mode. The method 800 then continues to 902.

Figure 9:
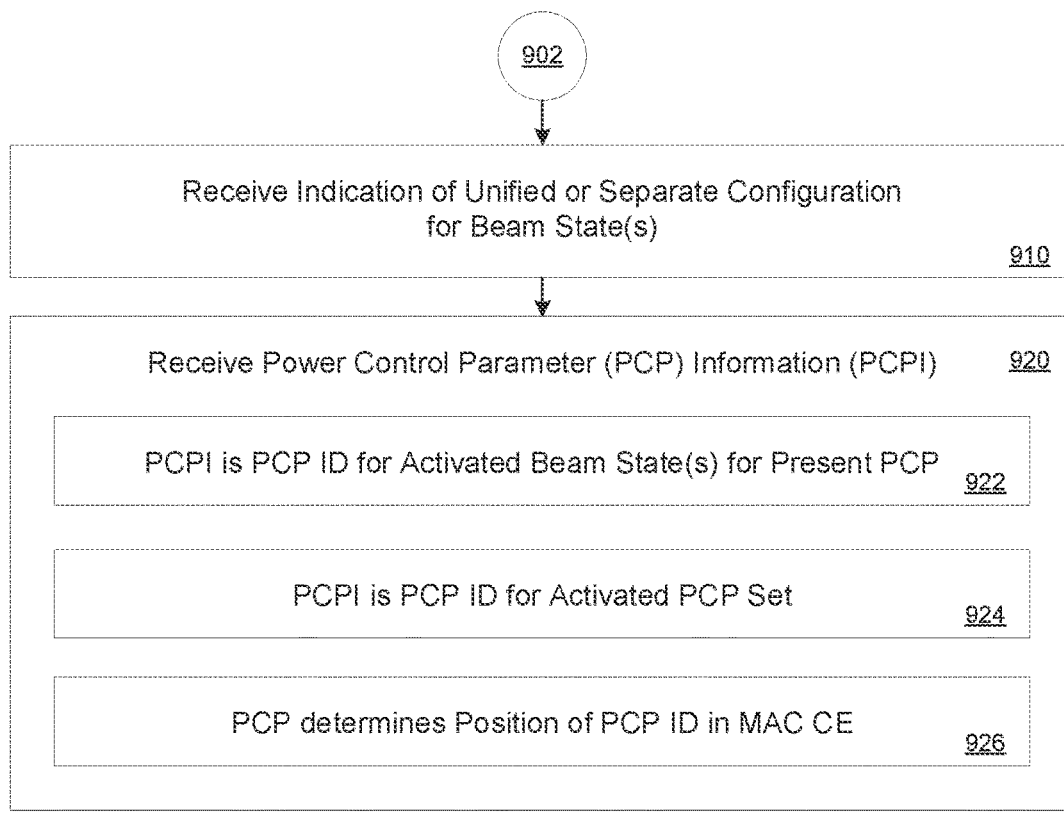
FIG. 9 illustrates a first example method of activating beam state in MAC CE further to the example method of FIG. 8.

FIG. 9 illustrates a first example method of activating beam state in MAC CE further to the example method of FIG. 8. In some implementations, at least one of the UE performs method 900 according to present implementations. In some implementations, the method 900 begins at 902. The method 900 then continues to 910.

At 910, the UE receives an indication of a unified or a separate configuration for a beam state or beam states. The method 1000 then continues to 920.

At 920, the UE receives power control parameter information. In some implementations, 920 includes at least one of steps 922, 924 and 926. At 922, the power control parameter information is a power control parameter identifier for at least one activated beam state for a power control parameter that is present. At 924, the power control parameter information is a power control parameter identifier for at least one activated power control parameter set. At 926, the power control parameter determines a position of a power control parameter identifier in MAC CE. In some implementations, a power control parameter identifier is configured by higher layer signaling, e.g. RRC signaling. In some implementations, the method 900 ends at 920.

In some implementations, the UE only supports a separate configuration with a combination the downlink mode and the uplink mode. In some implementations, the UE supports a separate configuration and a unified configuration with a combination of the downlink mode, the uplink mode, and the unified downlink and uplink mode. In some implementations, the UE only supports a separate configuration with the joint downlink and uplink mode. In some implementations, the UE supports a separate configuration and a unified configuration with a combination of the joint downlink and uplink mode and the unified downlink and uplink mode. In some implementations, the UE only supports a unified configuration with the unified downlink and uplink mode.

Figure 10:
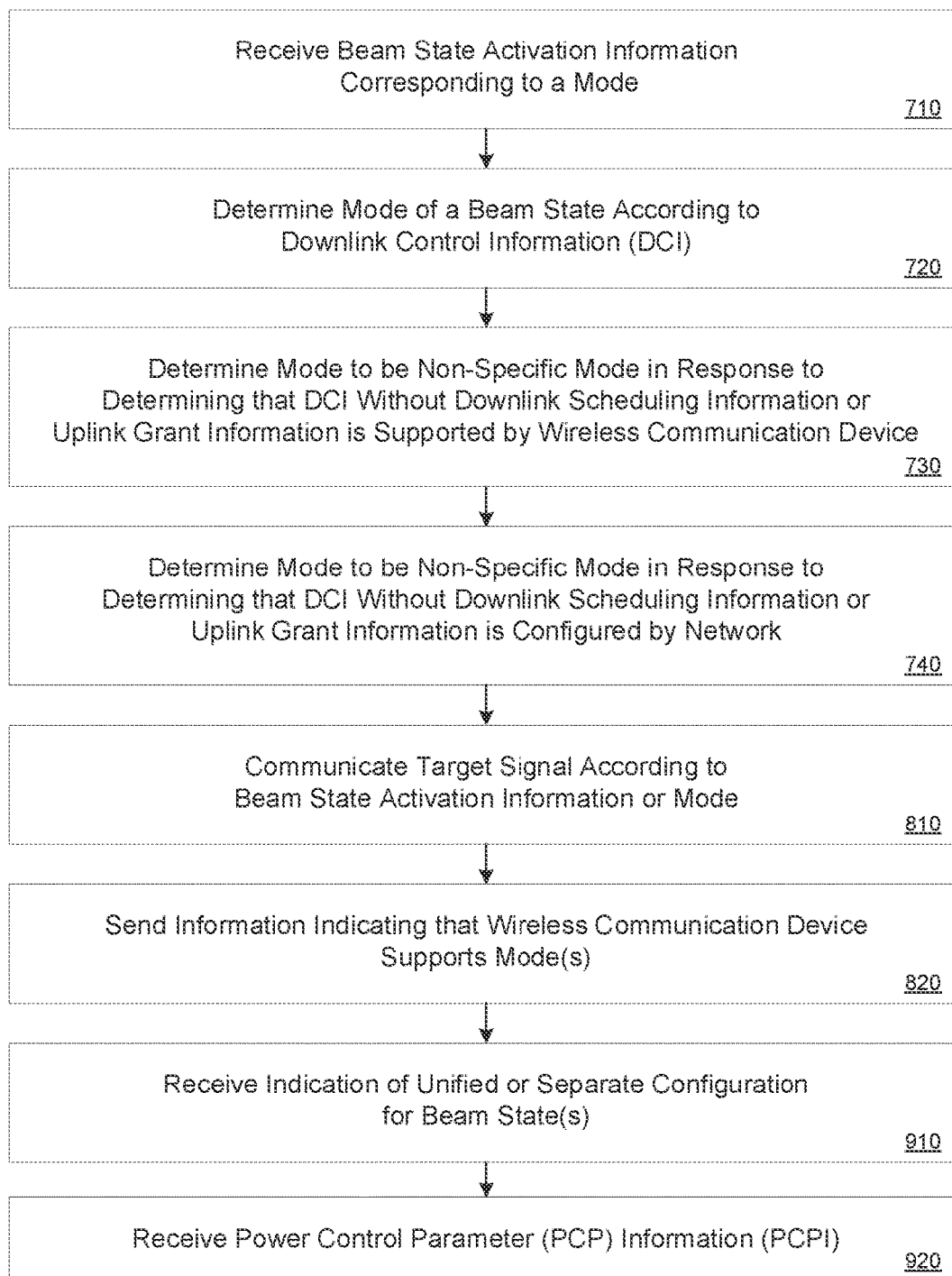
FIG. 10 illustrates a second example method of activating beam state in MAC CE, in accordance with present implementations.

FIG. 10 illustrates a second example method of activating beam state in MAC CE, in accordance with present implementations. In some implementations, at least one of the UE performs method 1000 according to present implementations. In some implementations, the method 1000 begins at 710.

At 710, the UE receives beam state activation information corresponding to a mode. The method 1000 then continues to 720. At 720, the UE determines a mode of a beam state according to downlink control information (DCI). The method 1000 then continues to 730. At 730, the UE determines a mode to be a non-specific mode in response to determining at a DCI without downlink scheduling information or uplink grant information is supported by a wireless communication device. The method 1000 then continues to 740. At 740, the UE determines a mode to be a non-specific mode in response to determining that a DCI without downlink scheduling information or uplink grant information is configured by a network. The method 1000 then continues to 810. At 810, the UE communicates a target signal according to beam state activation information or a mode. The method 1000 then continues to 820. At 820, the UE sends information indicating that a wireless communication device supports a particular mode or modes. The method 1000 then continues to 910. At 910, the UE receives an indication of a unified or a separate configuration for a beam state or beam states. The method 1000 then continues to 920. At 920, the UE receives power control parameter information. In some implementations, the method 1000 ends at 920.

Figure 11:
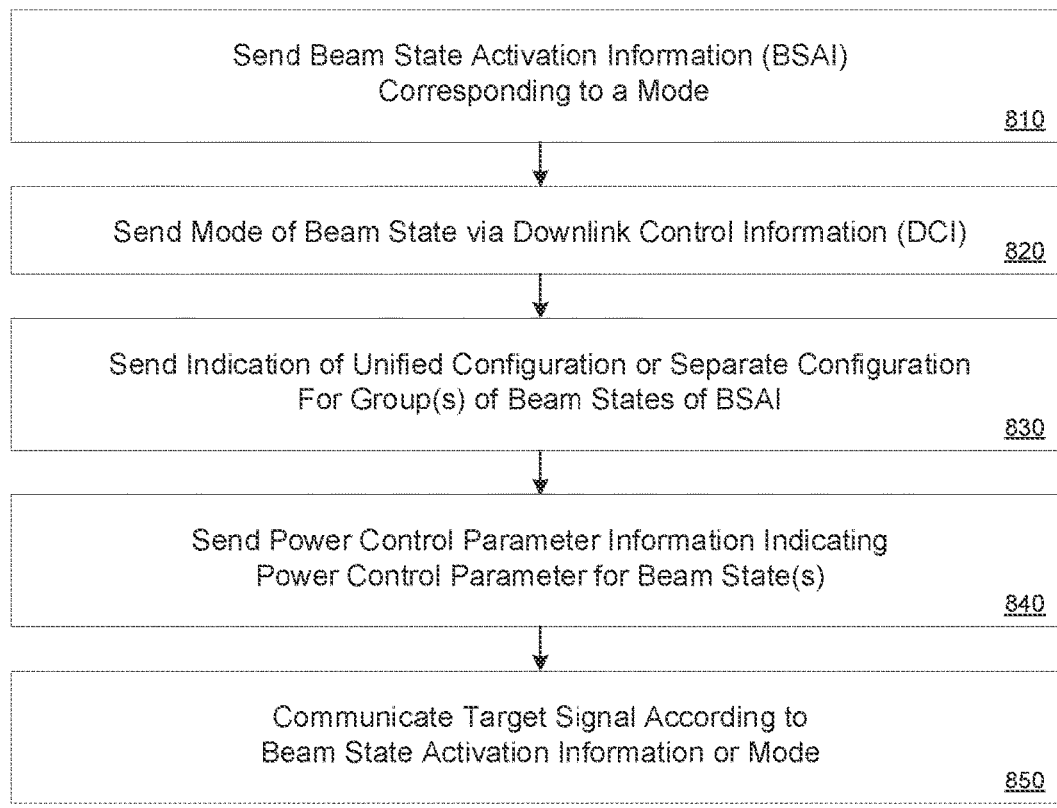
FIG. 11 illustrates a third example method of activating beam state in MAC CE, in accordance with present implementations.

FIG. 11 illustrates a third example method of activating beam state in MAC CE, in accordance with present implementations. In some implementations, at least one of the network (BS) performs method 1100 according to present implementations. In some implementations, the method 1100 begins at 1110.

At 1110, the network sends beam state activation information corresponding to a mode. The method 1100 then continues to 1120. At 1120, the network sends a mode of a beam state via downlink control information. The method 1100 then continues to 1130. At 1130, the network sends an indication of at least one of a unified configuration and a separate configuration for at least one group of beam states associated with beam state activation information. The method 1100 then continues to 1140. At 1140, the network sends power control parameter information indicating at least one power control parameter for at least one beam state. The method 1100 then continues to 1150. At 1150, the network communicates a target signal according to beam state activation information or a mode. In some implementations, the method 1100 ends at 1150.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

The invention claimed is:

1. A wireless communication method, comprising:
   receiving, by a wireless communication device from a network, beam state activation information, the beam state activation information corresponding to a mode; and
   communicating, by the wireless communication device with the network, a target signal according to the beam state activation information and the mode, wherein the target signal comprises at least one of downlink target signal or uplink target signal,
   wherein the mode comprises at least one of a unified downlink and uplink mode or a joint downlink and uplink mode, and
   wherein:
   the beam state activation information comprises one or more groups of beam states, wherein a beam state of the one or more groups of beam states corresponding to the unified downlink and uplink mode is used for both the downlink target signal and the uplink target signal, wherein among beam states of the one or more groups of beam states corresponding to the joint downlink and uplink mode, at least one beam state is used for the downlink target signal and at least one other beam state is used for the uplink target signal; and determining, by the wireless communication device, a maximum number of beam states that correspond to the mode, wherein the maximum number depends on a value indicated by the network, is a predefined value, or depends on capability of the wireless communication device.

2. The method of claim 1, wherein:

the first half of the beam states in a group of beam states corresponding to the joint downlink and uplink mode are used for the downlink target signal, and the other half of the beam states are used for the uplink target signal; or the first half of the beam states in a group of beam states corresponding to the joint downlink and uplink mode are used for the uplink target signal, and the other half of the beam states are used for the downlink target signal.

3. The method of claim 1, wherein a beam state of the one or more beam states correspond to the unified downlink and uplink mode.

4. The method of claim 1, further comprising:

sending, by the wireless communication device to the network, information indicating that the wireless communication device supports one of:

a combination of a downlink mode and an uplink mode;

a combination of the downlink mode, the uplink mode, and the unified downlink and uplink mode;

the joint downlink and uplink mode;

a combination of the joint downlink and uplink mode and the unified downlink and uplink mode; or the unified downlink and uplink mode.

5. The method of claim 1, wherein the maximum number comprises one of:

a maximum number of beam states with downlink usage in one group of beam states is M1;

a maximum number of beam states with uplink usage in one group of beam states is M2;

a maximum number of beam states with downlink usage in the beam state activation information is M3;

a maximum number of beam states with uplink usage in the beam state activation information is M4, and each of M1, M2, M3, or M4 is an integer equal to or greater than 1.

6. The method of claim 5, wherein:

a value of M1 is a predefined value or depends on a maximum number of beam states indicated in a DCI for the downlink target signal;

a value of M2 is a predefined value or depends on a maximum number of beam states indicated in a DCI for a uplink target signal; and M3 or M4 is a predefined value or depends on at least one of capability of the wireless communication device or configuration by the network.

7. The method of claim 6, wherein:

a number of activated beam states with the downlink usage comprises at least one of the number of beam states with the downlink mode, a number of beam states with the unified downlink and uplink mode, or a number of beam states with the joint downlink and uplink mode; and a number of beam states with of the uplink usage comprises at least one of a number of beam states with the number of beam states with the unified downlink and uplink mode, or the number of beam states with joint downlink and uplink mode.

8. The method of claim 1, wherein:

a number of beam states with downlink usage or uplink usage is a number of beam states with different beam state IDs with the downlink usage or the uplink usage respectively; or the number of beam states with the downlink usage or the uplink usage is a number of beam states with different values of a same type of Quasi Co-Location (QCL) parameter with usage of downlink or uplink respectively.

9. The method of claim 1, further comprising receiving, by the wireless communication device from the network, indication of at least one of a unified configuration or a separate configuration for the one or more groups of beam states, wherein one of:

the unified configuration is indicated, the mode is the unified downlink and uplink mode;

the separate configuration is indicated, the mode is the joint downlink and uplink mode; or both the unified configuration and the separate configuration are indicated, the mode is at least one of the unified downlink and uplink mode, or the joint downlink and uplink mode.

10. A wireless communication device, comprising:

at least one processor configured to:

receive, via an interface from a network, beam state activation information, the beam state activation information corresponding to a mode; and communicate, via the interface with the network, a target signal according to the beam state activation information and the mode, wherein the target signal comprises at least one of downlink target signal or uplink target signal, wherein the mode comprises at least one of a unified downlink and uplink mode, or a joint downlink and uplink mode, and wherein:

the beam state activation information comprises one or more groups of beam states, wherein a beam state of the one or more groups of beam states corresponding to the unified downlink and uplink mode is used for both the downlink target signal and the uplink target signal, wherein among beam states of the one or more groups of beam states corresponding to the joint downlink and uplink mode, at least one beam state is used for the downlink target signal and at least one other beam state is used for the uplink target signal; and determine a maximum number of beam states that correspond to the mode, wherein the maximum number depends on a value indicated by the network, is a predefined value, or depends on capability of the wireless communication device.

11. A wireless communication method, comprising:

sending, by a network to a wireless communication device, a beam state activation information, the beam state activation information corresponding to a mode; and communicating, by the network with the wireless communication device, a target signal according to the beam state activation information and the mode, wherein the target signal comprises at least one of downlink target signal or uplink target signal, wherein the mode comprises at least one of a unified downlink and uplink mode, or a joint downlink and uplink mode, and wherein:

the beam state activation information comprises one or more groups of beam states, wherein a beam state of the one or more groups of beam states corresponding to the unified downlink and uplink mode is used for both the downlink target signal and the uplink target signal, wherein among beam states of the one or more groups of beam states corresponding to the joint downlink and uplink mode, at least one beam state is used for the downlink target signal and at least one other beam state is used for the uplink target signal, and wherein the wireless communication device determines a maximum number of beam states that correspond to the mode, wherein the maximum number depends on a value indicated by the network, is a predefined value, or depends on capability of the wireless communication device.

12. A network node, comprising:

at least one processor configured to:

send, via am interface to a wireless communication device, a beam state activation information, the beam state activation information corresponding to a mode; and communicate, via the interface with the wireless communication device, a target signal according to the beam state activation information and the mode, wherein the target signal comprises at least one of downlink target signal or uplink target signal, wherein the mode comprises at least one of a unified downlink and uplink mode, or a joint downlink and uplink mode, and wherein:

the beam state activation information comprises one or more groups of beam states, wherein a beam state of the one or more groups of beam states corresponding to the unified downlink and uplink mode is used for both the downlink target signal and the uplink target signal, wherein among beam states of the one or more groups of beam states corresponding to the joint downlink and uplink mode, at least one beam state is used for the downlink target signal and at least one other beam state is used for the uplink target signal, wherein the wireless communication device determines a maximum number of beam states that correspond to the mode, wherein the maximum number depends on a value indicated by the network, is a predefined value, or depends on capability of the wireless communication device.

* * * * *